(12) United States Patent
Nakamura (10) Patent No.: US 11,677,246 B2
(45) Date of Patent: Jun. 13, 2023

(54) POWER MANAGEMENT METHOD AND POWER MANAGEMENT APPARATUS

(71) Applicant: KYOCERA Corporation, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 270 days.

(21) Appl. No.: 16/642,907

(22) PCT Filed: Aug. 21, 2018

(86) PCT No.: PCT/JP2018/030734
§ 371 (c)(1),
(2) Date: Feb. 28, 2020

(87) PCT Pub. No.: WO2019/044574
PCT Pub. Date: Mar. 7, 2019

(65) Prior Publication Data
US 2020/0343726 A1    Oct. 29, 2020

(30) Foreign Application Priority Data

Aug. 30, 2017    (JP) .............................. JP2017-165765

(51) Int. Cl.
*H02J 3/32*    (2006.01)
*H02J 3/00*    (2006.01)
*H02J 13/00*    (2006.01)
*H01M 10/48*    (2006.01)
*H02J 7/35*    (2006.01)
*H02J 3/38*    (2006.01)

(52) U.S. Cl.
CPC ............... *H02J 3/32* (2013.01); *H01M 10/48* (2013.01); *H02J 3/007* (2020.01); *H02J 3/38* (2013.01); *H02J 7/35* (2013.01); *H02J 13/00* (2013.01); *H02J 2300/20* (2020.01)

(58) Field of Classification Search
CPC ...... H02J 3/007; H02J 3/14; H02J 3/32; H02J 7/35; H02J 13/00
See application file for complete search history.

(56) References Cited

U.S. PATENT DOCUMENTS

| 9,954,360 | B2 * | 4/2018 | Belschner | ................ H02J 1/14 |
| 10,090,673 | B1 * | 10/2018 | Peck | ....................... H02J 1/102 |
| 2009/0015202 | A1 * | 1/2009 | Miura | ................... B60W 10/26 320/132 |
| 2010/0102569 | A1 * | 4/2010 | Pickard, III | .............. F03D 9/46 290/55 |

(Continued)

FOREIGN PATENT DOCUMENTS

| JP | 2013-169104 A | 8/2013 |
| JP | 2014-128107 A | 7/2014 |

*Primary Examiner* — Thomas C Lee
*Assistant Examiner* — Ameir Myers
(74) *Attorney, Agent, or Firm* — Hauptman Ham, LLP (57) ABSTRACT

A power management method comprises a step A of specifying a charging power supply used for charging of a storage battery apparatus, a step B of monitoring a storage capacity of the storage battery apparatus, and a step C of limiting, until the storage capacity becomes a predetermined threshold or less, the charging of the storage battery apparatus which uses a second charging power supply different from a first charging power supply when the charging power supply is the first charging power supply.

8 Claims, 5 Drawing Sheets

(56) References Cited

U.S. PATENT DOCUMENTS

| | | | |
|---|---|---|---|
| 2012/0228933 A1* | 9/2012 | Shiokawa | H02J 3/381 |
| | | | 307/19 |
| 2013/0207473 A1 | 8/2013 | Jain | |
| 2014/0125129 A1 | 5/2014 | Ueda | |
| 2016/0156203 A1* | 6/2016 | Han | H02J 7/007 |
| | | | 320/101 |
| 2016/0241031 A1* | 8/2016 | Hooshmand | H02J 3/38 |
| 2017/0117710 A1 | 4/2017 | Viehweider et al. | |
| 2018/0054070 A1* | 2/2018 | Krishnamoorthy | H02J 7/02 |
| 2019/0089163 A1* | 3/2019 | Wellner | H02J 9/002 |
| 2019/0222028 A1* | 7/2019 | Dibachi | H02J 3/383 |

\* cited by examiner

POWER MANAGEMENT METHOD AND POWER MANAGEMENT APPARATUS

RELATED APPLICATIONS

The present application is a National Phase of International Application No. PCT/JP2018/030734, filed Aug. 21, 2018, and claims priority based on Japanese Patent Application No. 2017-165765, filed Aug. 30, 2017.

TECHNICAL FIELD

The present invention relates to a power management method and a power management apparatus.

BACKGROUND ART

In recent years, a technique for suppressing the amount of power flow from a power grid to a facility or the amount of reverse power flow from the facility to the power grid in order to maintain a power supply-demand balance of the power grid is known (for example, Patent Literatures 1 and 2). Specifically, the amount of power flow or the amount of reverse power flow is suppressed by transmitting a control message from a power management server to a power management apparatus.

CITATION LIST

Patent Literature

Patent Literature 1: Japanese application publication No. 2013-169104
Patent Literature 2: Japanese application publication No. 2014-128107

SUMMARY OF INVENTION

Technical Problem

By the way, in recent years, there is considered a case where a storage battery apparatus is used as a distributed power supply which performs reverse power flow. In such a case, as a power supply (hereinafter referred to as a charging power supply) used for charging of the storage battery apparatus, various charging power supplies such as a solar cell apparatus, a fuel cell apparatus, and a power grid are considered.

However, for example, in a case where a value of reverse power flow power is determined by a type of the charging power supply, the value of the power to be backfed from the storage battery apparatus cannot be determined.

Therefore, the present invention has been made to solve the above-described problems, and an object of the present invention is to provide a power management method and power management apparatus which can specify a charging power supply used for charging power backfed from a storage battery apparatus.

Solution of the Problem

A power management method according to a first feature comprises a step A of specifying a charging power supply used for charging of a storage battery apparatus, a step B of monitoring a storage capacity of the storage battery apparatus, and a step C of limiting, until the storage capacity becomes a predetermined threshold or less, the charging of the storage battery apparatus which uses a second charging power supply different from a first charging power supply when the charging power supply is the first charging power supply.

A power management apparatus according to a second feature comprises a controller configured to identify a charging power supply used for charging of a storage battery apparatus. The controller is configured to monitor a storage capacity of the storage battery apparatus. The controller is configured to limit, until the storage capacity becomes a predetermined threshold or less, the charging of the storage battery apparatus which uses a second charging power supply different from a first charging power supply when the charging power supply is the first charging power supply.

Advantageous Effects of Invention

According to one aspect, it is possible to provide a power management method and a power management apparatus which can specify a charging power supply used for charging of power backfed from a storage battery apparatus.

DESCRIPTION OF EMBODIMENTS

An embodiment will be described below with reference to the drawings. In addition, the same or similar portions will be assigned the same or similar reference symbols in the following drawings.

In this regard, it should be born in mind that the drawings are schematic, and a ratio of each dimension is different from actual one. Therefore, each specific dimension needs to be decided in view of the following description. Of course, the drawings naturally includes portions having different dimensional relationships or ratios.

Embodiment (Power Management System)
Hereinafter, the power management system according to the embodiment will be described.

Figure 1:
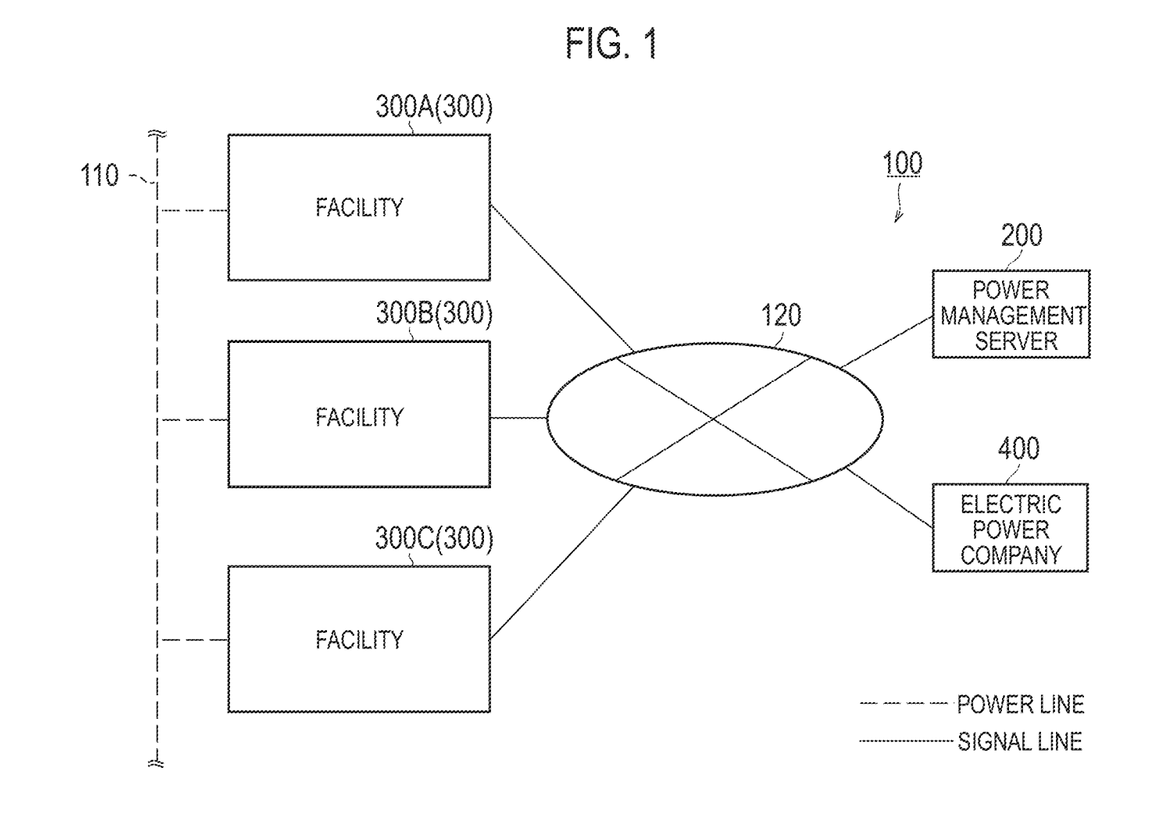
FIG. 1 is a diagram illustrating a power management system 100 according to an embodiment.

As illustrated in FIG. 1, a power management system 100 includes a power management server 200, facilities 300, and an electric power company 400. In FIG. 1, the facilities 300 are illustrated as a facility 300A to a facility 300C.

Each facility 300 is connected to a power grid 110. Hereinafter, a flow of power from the power grid 110 to the facility 300 will be referred to as a power flow, and a flow of power from the facility 300 to the power grid 110 will be referred to as a reverse power flow.

The power management server 200, the facilities 300, and the electric power company 400 are connected to a network 120. The network 120 may provide a line between the power management server 200 and the facility 300, and a line between the power management server 200 and the electric power company 400. The network 120 is, for example, the Internet. The network 120 may provide a dedicated line such as a Virtual Private Network (VPN).

The power management server 200 is a server which is managed by a company such as a power generation company, a power distribution company, a retail company or a resource aggregator. The resource aggregator is a company which provides power of reverse power flow from a VPP described below to a power generation company, a power distribution company, or a retail company. In the embodiment, the power management server 200 is an example of a power of reverse power flow purchase entity. The power management server 200 is one example of a power management server.

The power management server 200 transmits, to a local control apparatus 360 provided in the facility 300, a control message which instructs control of a distributed power supply (e.g., a solar cell apparatus 310, a storage battery apparatus 320, or a fuel cell apparatus 330) provided in the facility 300. For example, the power management server 200 may transmit a power flow control message (e.g., DR; Demand Response) for requesting power flow control, or may transmit a reverse power flow control message for requesting reverse power flow control. Furthermore, the power management server 200 may transmit a power control message for controlling an operating state of the distributed power supply. The control degree of power flow or reverse power flow may be expressed by an absolute value (e.g., ○○ kW) or a relative value (e.g., ○○%). Alternatively, the control degree of power flow or reverse power flow may be expressed by two or more levels. The control degree of power flow or reverse power flow may be expressed by an electricity charge (RTP; Real Time Pricing) determined by the current electricity supply-demand balance, or an electricity charge (TOU; Time of Use) determined by a past electricity supply-demand balance.

Figure 2:
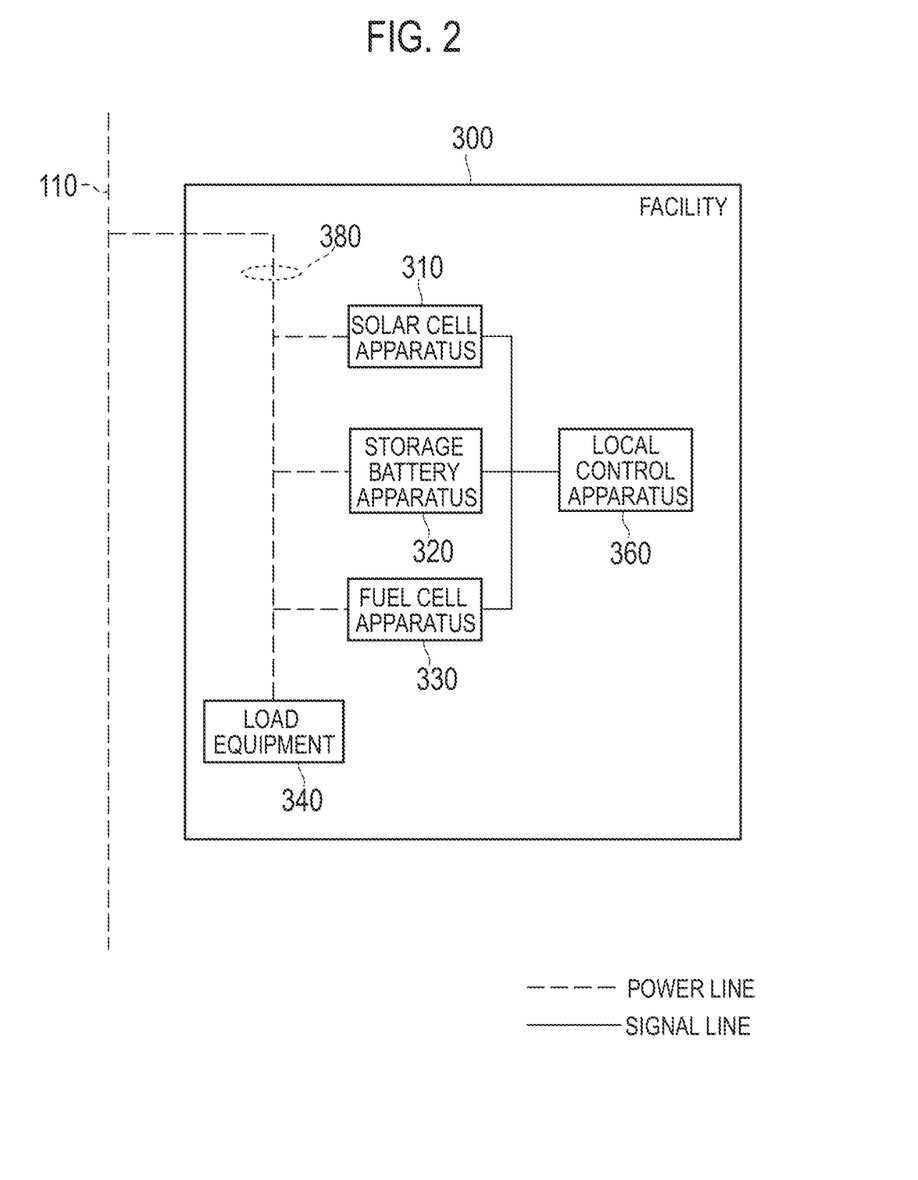
FIG. 2 is a diagram illustrating a facility 300 according to the embodiment.

As illustrated in FIG. 2, the facility 300 includes the solar cell apparatus 310, the storage battery apparatus 320, the fuel cell apparatus 330, a load equipment 340, the local control apparatus 360, and a power meter 380.

The solar cell apparatus 310 is a distributed power supply which generates power in response to light such as sunlight. The solar cell apparatus 310 is one example of a specific distributed power supply to which a predetermined purchase price is applied. The solar cell apparatus 310 includes, for example, a Power Conditioning System (PCS) and a solar panel.

Here, power outputted from the solar cell apparatus 310 may vary depending on the amount of received light such as sunlight. Therefore, when power generation efficiency of the solar cell apparatus 310 is taken into account, the power outputted from the solar cell apparatus 310 is variable power which can vary depending on the amount of received light.

The storage battery apparatus 320 is a distributed power supply which charges power and discharges power. The storage battery apparatus 320 is one example of a distributed power supply to which a predetermined purchase price is not applied, and is a distributed power supply which has a rated operation mode for outputting rated power. The storage battery apparatus 320 includes, for example, a PCS and a storage battery cell.

In this regard, the rated power of the storage battery apparatus 320 may be expressed by power (W) itself, or may be express by a voltage (V) and a current (A). For example, the rated power may be specified by the minimum/maximum discharge power value (W), or may be specified by a minimum/maximum discharge current value (A) and the rated voltage (V). The rated power may be considered as a representative value of a history of power outputted from the storage battery apparatus 320. The representative value may be a maximum value of the history of power outputted from the storage battery apparatus 320, a minimum value of the history of the power outputted from the storage battery apparatus 320, or an average value of the history of the power outputted from the storage battery apparatus 320.

The fuel cell apparatus 330 is a distributed power supply which generates power using a fuel. The fuel cell apparatus 330 is one example of a distributed power supply to which a predetermined purchase price is not applied, and is a distributed power supply which has a rated operation mode for outputting rated power. The fuel cell apparatus 330 includes, for example, a PCS and a fuel cell.

For example, the fuel cell apparatus 330 may be a solid oxide fuel cell (SOFC), a polymer electrolyte fuel cell (PEFC), a phosphoric acid fuel cell (PAFC) or a molten carbonate fuel cell (MCFC).

Here, the rated power of the fuel cell apparatus 330 may be expressed by the power (W) itself, or may be expressed by the voltage (V) and the current (A). For example, the rated power may be specified by a rated power generation amount (W). The rated power may be considered as a representative value of the history of power outputted from the fuel cell apparatus 330. The representative value may be a maximum value of the history of power outputted from the fuel cell apparatus 330, may be a minimum value of the history of power outputted from the fuel cell apparatus 330, or may an average value of the history of power outputted from the fuel cell apparatus 330.

In the embodiment, the solar cell apparatus 310, the storage battery apparatus 320, and the fuel cell apparatus 330 may be power supplies used for a Virtual Power Plant (VPP).

The load equipment 340 is an equipment which consumes power. The load equipment 340 is, for example, an air conditioner, a lighting equipment or an Audio Visual (AV) equipment.

The local control apparatus 360 is a device (EMS; Energy Management System) which manages power of the facility 300. The local control apparatus 360 may control the operating state of the solar cell apparatus 310, may control the operation state of the storage battery apparatus 320 provided in the facility 300, or the operation state of the fuel cell apparatus 330 provided in the facility 300. Details of the local control apparatus 360 will be described later (see FIG. 4).

In the embodiment, communication between the power management server 200 and the local control apparatus 360 is performed according to a first protocol. On the other hand, communication between the local control apparatus 360 and the distributed power supply (the solar cell apparatus 310, the storage battery apparatus 320 or the fuel cell apparatus 330) is performed according to a second protocol different from the first protocol. As the first protocol, for example, a protocol compliant with Open Automated Demand Response (ADR) 2.0 or a unique dedicated protocol can be used. As the second protocol, for example, a protocol compliant with ECHONET Lite, Smart Energy Profile (SEP) 2.0, KNX, or a unique dedicated protocol can be used. Note that the first protocol and the second protocol only need to be different. For example, even if both are unique dedicated protocols, both only need to be protocols which are created according to different rules.

The power meter 380 is one example of a first power meter which measures the amount of power flow from the power grid 110 to the facility 300 and the amount of reverse power flow from the facility 300 to the power grid 110. The power meter 380 is, for example, a smart meter which belongs to the electric power company 400.

Here, the power meter 380 transmits, to the local control apparatus 360, a message including an information element indicating a measurement result (the amount of power flow or reverse power flow (Wh)) in a predetermined unit time per predetermined unit time (e.g., 30 minutes). The power meter 380 may autonomously transmit a message, or may transmit a message in response to a request from the local control apparatus 360.

The electric power company 400 is an entity which provides an infrastructure such as the power grid 110, and is, for example, a power generation company or a power distribution company. The electric power company 400 may entrust various business operations to an entity which manages the power management server 200.

(Power Management Server)

Figure 3:
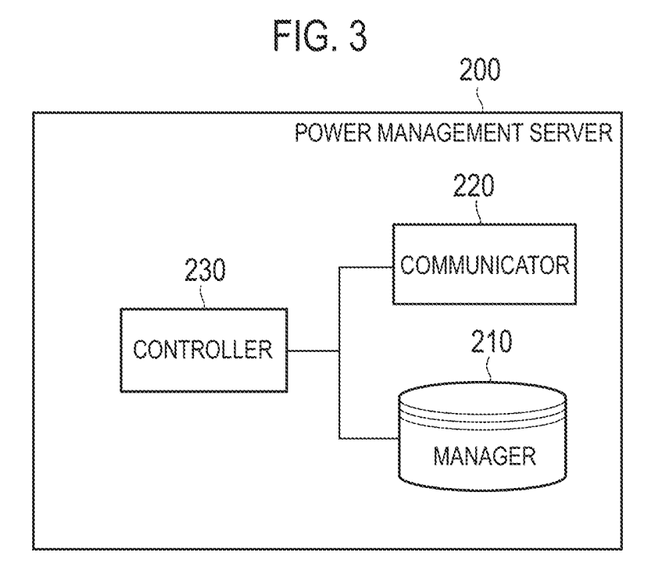
FIG. 3 is a diagram illustrating a power management server 200 according to the embodiment.

Hereinafter, the power management server according to the embodiment will be described. As illustrated in FIG. 3, the power management server 200 includes a manager 210, a communicator 220, and a controller 230. The power management server 200 is one example of a Virtual Top Node (VTN).

The manager 210 includes a storage medium such as a non-volatile memory and/or an HDD, and manages data regarding the facility 300. The data regarding the facility 300 includes, for example, the type of the distributed power supply (the solar cell apparatus 310, the storage battery apparatus 320 or the fuel cell apparatus 330) provided in the facility 300, and a specification of the distributed power supply (the solar cell apparatus 310, the storage battery apparatus 320 or the fuel cell apparatus 330) provided in the facility 300. The specification may be rated generated power (W) of the solar cell apparatus 310, rated power (W) of the storage battery apparatus 320, and rated power (W) of the fuel cell apparatus 330.

The communicator 220 includes a communication module, and communicates with the local control apparatus 360 via the network 120. As described above, the communicator 220 performs communication according to the first protocol. For example, the communicator 220 transmits the first message to the local control apparatus 360 according to the first protocol. The communicator 220 receives a first message response from the local control apparatus 360 according to the first protocol.

The controller 230 includes a memory and a CPU, and controls each component provided in the power management server 200. The controller 230 instructs the local control apparatus 360 provided in the facility 300 to control the distributed power supply (the solar cell apparatus 310, the storage battery apparatus 320, or the fuel cell apparatus 330) provided in the facility 300 by, for example, transmitting a control message. As described above, the control message may be a power flow control message, may be a reverse power flow control message, or may be a power supply control message.

(Local Control Apparatus)

Figure 4:
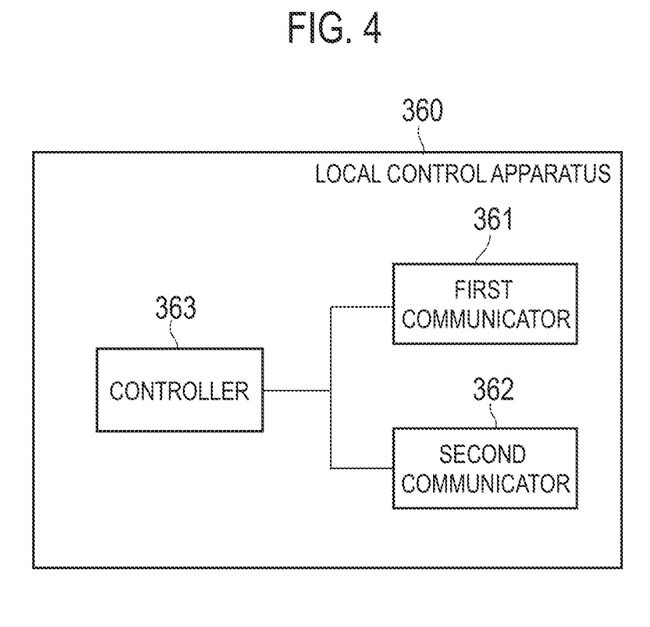
FIG. 4 is a diagram illustrating a local control apparatus 360 according to the embodiment.

Hereinafter, a local control apparatus according to the embodiment will be described. As illustrated in FIG. 4, the local control apparatus 360 includes a first communicator 361, a second communicator 362, and a controller 363. The local control apparatus 360 is one example of a Virtual End Node (VEN).

The first communicator 361 includes a communication module, and communicates with the power management server 200 via the network 120. As described above, the first communicator 361 performs communication according to the first protocol. For example, the first communicator 361 receives the first message from the power management server 200 according to the first protocol. The first communicator 361 transmits the first message response to the power management server 200 according to the first protocol.

The second communicator 362 includes a communication module, and communicates with a distributed power supply (the solar cell apparatus 310, the storage battery apparatus 320, or the fuel cell apparatus 330). As described above, the second communicator 362 performs communication according to the second protocol. For example, the second communicator 362 transmits a second message to the distributed power supply according to the second protocol. The second communicator 362 receives a second message response from the distributed power supply according to the second protocol.

The controller 363 includes a memory and a CPU, and controls each component provided in the local control apparatus 360. Specifically, in order to control power of the facility 300, the controller 363 instructs the equipment to set the operating state of the distributed power supply by transmitting the second message and receiving the second message response. In order to manage the power of the facility 300, the controller 363 may instruct the distributed power supply to report the information on the distributed power supply by transmitting the second message and receiving the second message response.

(Application Scene)

Figure 5:
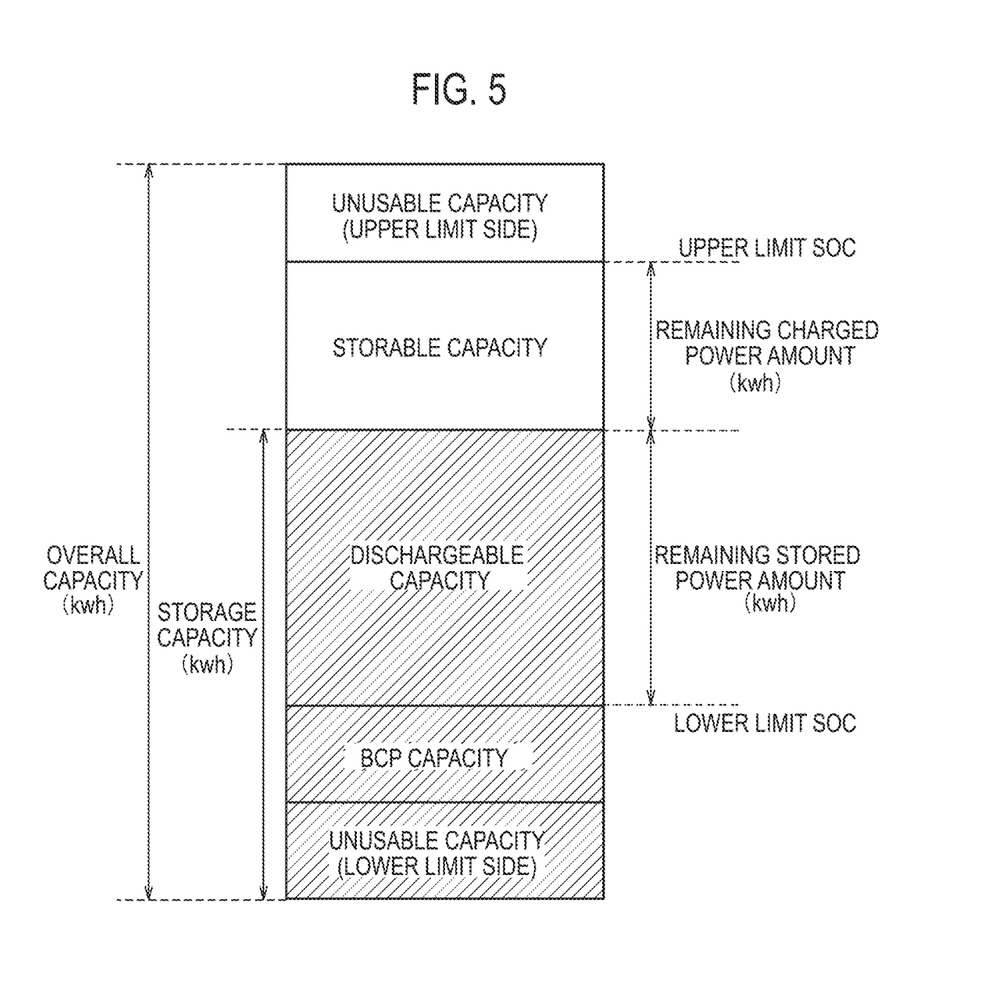
FIG. 5 is a diagram illustrating an application scene according to the embodiment.

Hereinafter, application scenes of the embodiment will be described. Specifically, as illustrated in FIG. 5, a lower limit State of Charge (SOC) and an upper limit SOC are determined for the overall capacity of the storage battery apparatus 320. The lower limit SOC is set to a first remaining amount, and the upper limit SOC is set to a second remaining amount which is a higher remaining stored power amount than the first remaining amount. Furthermore, the overall capacity of the storage battery apparatus 320 includes an unusable capacity (lower limit side) for protecting the storage battery apparatus 320, and an emergency capacity (BCP; Business Continuity Plan) for dealing with an emergency such as a disaster. The lower limit SOC is determined such that the remaining stored power amount does not fall below the BCP capacity and the unusable capacity (lower limit side). That is, the lower limit SOC is a total value of the BCP capacity and the unusable capacity (lower limit side). The upper limit SOC is determined such that the storage capacity does not reach the unusable capacity (upper limit side). That is, the upper limit SOC is a value obtained by subtracting the unusable capacity (upper limit side) from the overall capacity. Under such a premise, the remaining stored power amount which can be discharged by the storage battery apparatus 320 is a value obtained by subtracting the lower limit SOC from the electricity storage capacity. The remaining stored power amount which can be charged by the storage battery apparatus 320 is a value obtained by subtracting the storage capacity from the upper limit SOC.

In such a case, the power management apparatus (the PCS of the storage battery apparatus 320 in this case) specifies a charging power supply used for charging of the storage battery apparatus 320. The storage battery apparatus 320 monitors the storage capacity of the storage battery apparatus. When the charging power supply is a first charging power supply, the storage battery apparatus 320 limits charging of the storage battery apparatus which uses a second charging power supply different from the first charging power supply until the storage capacity becomes a predetermined threshold or less.

In the embodiment, the predetermined threshold is determined by at least one of the BCP capacity and the unusable capacity (lower limit side). For example, the predetermined threshold may be the above-described lower limit SOC (the total value of the BCP capacity and the unusable capacity (lower limit side)). Alternatively, the predetermined threshold may be an unusable capacity (lower limit side).

In the embodiment, the charging power supply is one of the power grid 110, the solar cell apparatus 310, and the fuel cell apparatus 330 in the example illustrated in FIG. 2. For example, the power grid 110 and power supplies (the solar cell apparatus 310 and the fuel cell apparatus 330) other than the power grid 110 may be distinguished as charging power supplies. In such a case, the first charging power supply may be power supplies (e.g., the solar cell apparatus 310 and the fuel cell apparatus 330) other than the power grid 110, and the second charging power supply may be the power grid 110. Conversely, the first charging power supply may be the power grid 110, and the second charging power supply may be power supplies (e.g., the solar cell apparatus 310 and the fuel cell apparatus 330) other than the power grid 110. Alternatively, power supplies other than the power grid 110 may be also individually distinguished. In such a case, the first charging power supply is one of the power grid 110, the solar cell apparatus 310, and the fuel cell apparatus 330, and the second charging power supply is one power supply of the power grid 110, the solar cell apparatus 310, and the fuel cell apparatus 330 different from the first charging power supply.

For example, a case where a $CO_2$ emission amount of the power supply other than the power grid 110 is larger than a $CO_2$ emission amount of the power grid 110, or a case where a purchase price of power deriving from the power supply other than the power grid 110 is lower than a purchase price of power deriving from the power grid 110 will be considered. In such a case, when the first charging power supply is the power supply other than the power grid 110 and the second charging power supply is the power grid 110, it is possible to appropriately specify a charging power amount which uses the power supply other than the power grid 110 by preventing mixing of the charging power supplies used for charging of the storage battery apparatus 320. For example, as the power supply other than the power grid 110, an engine-type power generation apparatus are considered.

Conversely, a case where the $CO_2$ emission amount of the power supply other than power grid 110 is less than the $CO_2$ emission amount of the power grid 110, or a case where the purchase price of power deriving from the power supply other than power grid 110 is higher than the purchase price of power deriving from the power grid 110 will be considered. In such a case, when the first charging power supply is the power grid 110 and the second charging power supply is the power supply other than the power grid 110, it is possible to appropriately specify the charging power amount which uses the power grid 110 by preventing mixing of the charging power supplies used for charging of the storage battery apparatus 320. For example, as the power supply other than the power grid 110, a wind power generation apparatus or a solar cell apparatus are considered.

In the embodiment, when the storage capacity is a predetermined threshold or less, the storage battery apparatus 320 may permit charging of the storage battery apparatus which uses the second charging power supply. That is, the storage battery apparatus 320 may delimit charging of the storage battery apparatus which uses the second charging power supply. This is to quickly resolve such a situation even when the storage capacity falls below the lower limit SOC in an emergency such as a disaster.

In the embodiment, the storage battery apparatus 320 may manage the type of the charging power supply used for charging the remaining storage battery capacity exceeding a predetermined threshold. The storage battery apparatus 320 may output the type of the charging power supply. For example, the storage battery apparatus 320 transmits, to the local control apparatus 360, a message including the information element indicating the type of the charging power supply. Such a message may be compliant with the ECHONET Lite standard. That is, the information element indicating the type of charging power supply may be newly determined. Alternatively, the storage battery apparatus 320 may output the type of the charging power supply from a display or a speaker provided in the storage battery apparatus 320, or may output the type of charging power supply to a user terminal such as a smartphone or a tablet terminal.

For example, when the power grid 110 and the power supplies (the solar cell apparatus 310 and the fuel cell apparatus 330) other than power grid 110 are distinguished as charging power supplies, the types of charging power supplies may be two types of the power grid 110 and the power supplies other than the power grid 110. On the other hand, when the power supply other than power grid 110 is also individually distinguished, the types of charging power supplies may be three types of the power grid 110, the solar cell apparatus 310, and the fuel cell apparatus 330. The type of the charging power supply may include a type whose charging power supply type is unknown. Further, the type of the charging power supply may be distinguished between renewable energy supplied from the solar cell apparatus 310, and non-renewable energy supplied from a power grid or a fuel cell which generates power with a gas fuel.

Here, the case where the power management apparatus which performs the above-described operation is the storage battery apparatus 320 (PCS) has been described. However, the embodiment is not limited to this. The power management apparatus may be the local control apparatus 360 or the power management server 200.

(Power Management Method)

Figure 6:
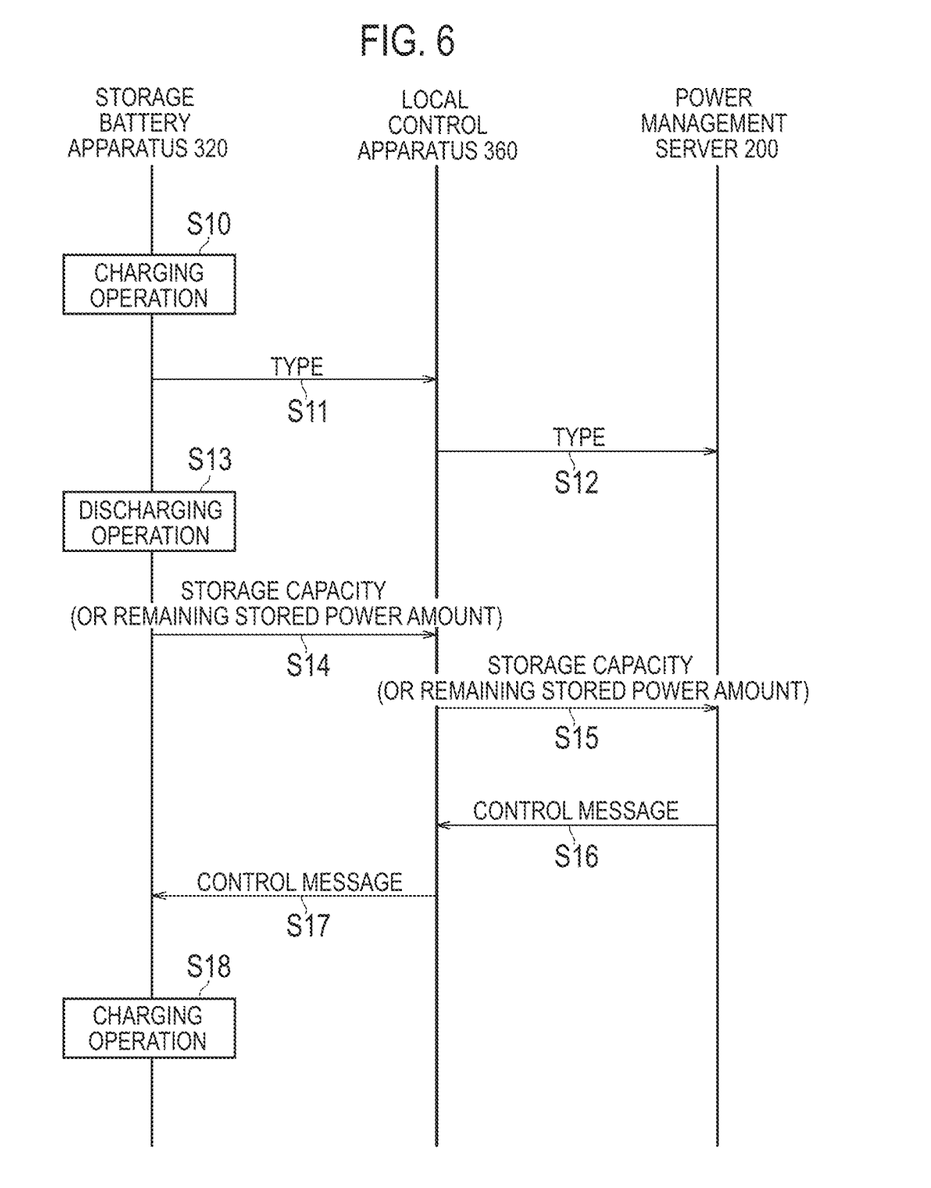
FIG. 6 is a diagram illustrating a power management method according to the embodiment.

Hereinafter, a power management method according to the embodiment will be described. FIG. 6 illustrates a case where the power management apparatus is the power management server 200. Until the power management server 200 gives a permission, charging which uses the second charging power supply different from the first charging power supply is limited.

In step S10, the storage battery apparatus 320 performs a charging operation which uses the first charging power supply.

In step S11, the storage battery apparatus 320 transmits, to the local control apparatus 360, a message including an information element indicating the type of charging power supply. Step S11 may be performed at a timing at which the charging power supply is changed, or may be performed at a regular timing. Such a message may be compliant with the ECHONET Lite standard. For example, such a message may be a response command (GET response command) to a request command (GET command) of the local control apparatus 360, or a notification command (INF command) transmitted autonomously from the storage battery apparatus 320.

In step S12, the local control apparatus 360 transmits, to the power management server 200, a message including the information element indicating the type of charging power supply. Such a message may be compliant with Open ADR2.0.

In step S13, the storage battery apparatus 320 performs a discharging operation. The discharging operation may be performed according to an instruction from the local control apparatus 360 or may be performed according to an instruction from the power management server 200. Alternatively, the discharging operation may be autonomously performed by the storage battery apparatus 320.

In step S14, the storage battery apparatus 320 transmits, to the local control apparatus 360, a message including an information element indicating the storage capacity (or remaining stored power amount). Step S14 may be performed at a timing at which the storage capacity reaches the predetermined threshold, or may be performed at a regular timing. Such a message may be compliant with the ECHONET Lite standard. For example, such a message may be the response command (GET response command) to the request command (GET command) of the local control apparatus 360, or the notification command (INF command) transmitted autonomously from the storage battery apparatus 320.

In step S15, the local control apparatus 360 transmits, to the power management server 200, a message including an information element indicating the storage capacity (or remaining stored power amount). Such a message may be compliant with Open ADR2.0.

In step S16, the power management server 200 monitors the storage capacity (or the remaining stored power amount) of the storage battery apparatus 320 based on the message received in step S15. The power management server 200 limits charging which uses the second charging power supply different from the first charging power supply until the storage capacity becomes the predetermined threshold or less. That is, when the storage capacity is the predetermined threshold or less, the power management server 200 transmits, to the local control apparatus 360, a control message which permits charging which uses the second charging power supply different from the first charging power supply. Such a message may be compliant with Open ADR2.0.

In step S17, the local control apparatus 360 transmits, to the storage battery apparatus 320, a control message which permits charging which uses the second charging power supply different from the first charging power supply. Such a message may be compliant with the ECHONET Lite standard. For example, such a message may be a setting command (SET command) which includes an information element which specifies an operation mode of the storage battery apparatus 320, or a setting command (SET command) which includes an information element which specifies the charging power amount of the storage battery apparatus 320.

In step S18, the storage battery apparatus 320 performs a charging operation which uses a second distributed power supply.

The example illustrated in FIG. 6 has exemplified the case where the power management apparatus is the power management server 200. However, the embodiment is not limited to this.

For example, the power management apparatus may be the local control apparatus 360. In such a case, step S12, step S15, and step S16 may be omitted. That is, the local control apparatus 360 may monitor the storage capacity (or the remaining stored power amount) of the storage battery apparatus 320 based on the message received in step S14, and, when the storage capacity is the predetermined threshold or less, may permit charging which uses the second charging power supply different from the first charging power supply. However, reporting step S12 and step S15) from the local control apparatus 360 to the power management server 200 may be executed.

Alternatively, the power management apparatus may be a PCS of the storage battery apparatus 320. In such a case, step S11, step S12, and step S14 to step S17 may be omitted. That is, the storage battery apparatus 320 may autonomously monitor the storage capacity (or the remaining stored power amount) of the storage battery apparatus 320, and, when the storage capacity is the predetermined threshold or less, permit charging which uses the second charging power supply different from the first charging power supply. However, reporting (step S11, step S12, step S14 and step S15) from the storage battery apparatus 320 to the local control apparatus 360 or the power management server 200 may be executed.

(Function and Effect)

In the embodiment, until the storage capacity of the storage battery apparatus 320 becomes the predetermined threshold or less, charging which uses the second charging power supply different from the first charging power supply is limited. It is possible to prevent mixing of charging power supplies used for charging the storage battery apparatus 320. Consequently, it is possible to specify the charging power supply used for charging of power which is backfed from the storage battery apparatus 320.

In the embodiment, when the storage capacity is the predetermined threshold or less, charging of the storage battery apparatus 320 which uses the second charging power supply is permitted. Consequently, it is possible to quickly resolve a state where the storage capacity falls below the predetermined threshold (e.g., the lower limit SOC).

[Modification 1]

Hereinafter, modification 1 of the embodiment will be described. Differences from the embodiment will be mainly described below.

Specifically, the embodiment does not assume a case where limiting charging of the storage battery apparatus 320 which uses the second charging power supply fails. On the other hand, modification 1 will describe a case where limiting charging of the storage battery apparatus 320 which uses the second charging power supply fails. That is, modification 1 will describe a case where the storage battery apparatus 320 is charged using the second charging power supply at a stage at which the storage capacity of the storage battery apparatus 320 is larger than the predetermined threshold.

As a case where such a situation occurs, for example, the following cases are considered.

First, there is considered a case where the storage battery apparatus 320 is charged using the power grid 110 before blackout of the power grid 110, and the storage battery apparatus 320 is charged using the solar cell apparatus 310 after the blackout of the power grid 110. For example, there is considered a case where, when output power of the solar cell apparatus 310 is larger than the power consumption of the load equipment 340 in a blackout state of the power grid 110, the storage battery apparatus 320 is charged using surplus power of the solar cell apparatus 310.

Secondly, there is considered a case where the storage battery apparatus 320 is charged by an arbitrary user operation in a state where the storage battery apparatus 320 is not controlled by the power management server 200. For example, there is considered a case where any user operation is likely to be performed without taking into account the type of the charging power supply used for charging of the storage battery apparatus 320, and therefore there are the first charging power supply and the second charging power supply as the charging power supplies in a mixed fashion.

In these cases, when limiting charging of the storage battery apparatus 320 which uses the second charging power supply fails, the storage battery apparatus 320 limits a reverse power flow from the storage battery apparatus 320 to the power grid 110. For example, the storage battery apparatus 320 may limit the reverse power flow from the storage battery apparatus 320 to the power grid 110 until the storage capacity becomes the predetermined threshold or less. In other words, when the capacity exceeding the predetermined threshold is obtained among the storage capacity by charging which uses only one of the first charging power supply and the second charging power supply, and the reverse power flow condition is satisfied, actual reverse power flow may be performed. Alternatively, the storage battery apparatus 320 may delimit the reverse power flow from the storage battery apparatus 320 to the power grid 110 by receiving a message received from the power management server. Such limitation may be executed by the local control apparatus 360 or may be executed by the power management server 200.

Other Embodiments

Although the present invention has been described with reference to the above-described embodiment, it should not be understood that the descriptions and drawings constituting part of this disclosure limit the present invention. This disclosure makes various alternative embodiments, examples and application techniques obvious for one of ordinary skill in the art.

Although not specifically mentioned in the embodiment, distinction between the first charging power supply and the second charging power supply may be determined according to whether or not the charging power supply requires a usage charge (consignment charge) of the power grid 110. The charging power supply that does not require the consignment charge is, for example, the power grid 110, and the charging power supplies that require the consignment charge are, for example, the solar cell apparatus 310 and the fuel cell apparatus 330. Alternatively, distinction between the first charging power supply and the second charging power supply may be determined according to whether or not a purchase price applied to reverse power flow power is the same. Even when there are two or more distributed power supplies, if the purchase price is the same, the two or more distributed power supplies may not be distinguished.

In the embodiment, the predetermined threshold may be the lower limit SOC (a total value of the BCP capacity and the unusable capacity (lower limit side)) or an unusable capacity (lower limit side). However, the embodiment is not limited to this. The predetermined threshold may be determined by a power generation company, a power distribution company, a retail company or a resource aggregator, or may be determined by a user who manages the storage battery apparatus 320. The predetermined threshold may be set by a message transmitted from one of the power management server 200, the local control apparatus 360, and the electric power company 400. The predetermined threshold may be set by using an interface (remote controller) provided in the storage battery apparatus 320.

The embodiment has described a case where the storage battery apparatus 320 is provided separately from the solar cell apparatus 310. However, the embodiment is not limited to this. The storage battery apparatus 320 may be a device including a solar panel, a storage battery cell, and one PCS (hybrid PCS). The hybrid PCS converts Direct Current (DC) power outputted from the solar panel and the storage battery cell into Alternating Current (AC) power, and converts AC power into DC power inputted to the storage battery cell.

In the embodiment, the power supply other than the power grid 110 may be a power supply which outputs power which is given a renewable energy certificate. The renewable energy certificate is a certificate which is given by a certification body to power generated by using renewable energy such as solar power, wind power, and geothermal heat.

In the embodiment, the power supply other than the power grid 110 may be a power supply which outputs power deriving from a regenerative brake. For example, power deriving from the regenerative brake is power generated by operating an electric motor as a generator using energy generated when a motion of a device (such as an automobile, a train, and an elevator) having the electric motor is slowed down.

Although not specifically mentioned in the embodiment, the storage battery apparatus 320 may be a storage battery apparatus which is fixedly connected to a power line provided in the facility 300, or a storage battery apparatus which is detachably connected to the power line provided in the facility 300. As a storage battery apparatus detachably connected to a power line provided in the facility 300, a storage battery apparatus provided in an electric vehicle is considered.

In the embodiment, the solar cell apparatus 310 is exemplified as the specific distributed power supply to which the predetermined purchase price is applied. However, the embodiment is not limited to this. The distributed power supply may be a distributed power supply which uses natural energy such as biomass, wind power, or geothermal heat.

In the embodiment, the predetermined purchase price is a price which is applied to power of reverse power flow resulting from the power outputted from the solar cell apparatus 310. However, the embodiment is not limited to this. For example, the predetermined purchase price may be a price applied to power generated from renewable energy such as the above-described natural energy. The predetermined purchase price may be a price applied by a Feed-in Tariff (FIT) which is a system for purchasing power at a fixed price. The predetermined purchase price may be higher than a price applied to power of reverse power flow resulting from power outputted from a distributed power supply to which the predetermined purchase price is not applied.

Although not particularly mentioned in the embodiment, the local control apparatus 360 provided in the facility 300 may not necessarily be provided in the facility 300. For example, part of the functions of the local control apparatus 360 may be provided by a cloud server provided on the Internet. That is, it may be considered that the local control apparatus 360 includes a cloud server.

The embodiment has exemplified the case where the first protocol is a protocol compliant with Open ADR2.0 and the second protocol is a protocol compliant with ECHONET Lite. However, the embodiment is not limited to this. The first protocol only needs to be a protocol which is standardized as a protocol used for communication between the power management server 200 and the local control apparatus 360. The second protocol only needs to be a protocol which is standardized as a protocol used in the facility 300.

In addition, this application claims priority to Japanese Patent Application No. 2017-165765 (filed on Aug. 30, 2017), the entire contents of which are incorporated by reference herein.

The invention claimed is:

1. A power management method, comprising:
specifying a charging power supply used for charging of a storage battery apparatus;
monitoring a storage capacity of the storage battery apparatus;
limiting, until the storage capacity becomes a predetermined threshold or less, the charging of the storage battery apparatus which uses a second charging power supply different from a first charging power supply when the charging power supply is the first charging power supply; and
specifying a power supply used for charging of power back-fed from the storage battery apparatus to a power grid, by specifying a type of the first charging power supply used for the charging of the storage battery apparatus exceeding the predetermined threshold to prevent mixing of the first and second charging power supplies.

2. The power management method according to claim 1, wherein
the first charging power supply is a power supply other than the power grid, and
the second charging power supply is the power grid.

3. The power management method according to claim 1, wherein
the first charging power supply is the power grid, and
the second charging power supply is a power supply other than the power grid.

4. The power management method according to claim 1, further comprising permitting the charging of the storage battery apparatus which uses the second charging power supply when the storage capacity is the predetermined threshold or less.

5. The power management method according to claim 1, wherein the predetermined threshold is determined by at least one of an unusable capacity secured for protection of the storage battery apparatus, and an emergency capacity secured as an emergency power supply.

6. The power management method according to claim 1, further comprising outputting the type of the charging power supply.

7. The power management method according to claim 1, further comprising limiting a reverse flow from the storage battery apparatus to the power grid when limiting the charging of the storage battery apparatus which uses the second charging power supply fails.

8. A power management apparatus comprising a controller configured to specify a charging power supply used for charging of a storage battery apparatus,
wherein the controller is configured to:
monitor a storage capacity of the storage battery apparatus;
limit, until the storage capacity becomes a predetermined threshold or less, the charging of the storage battery apparatus which uses a second charging power supply different from a first charging power supply when the charging power supply is the first charging power supply; and
specify a power supply used for charging of power back-fed from the storage battery apparatus to a power grid, by specifying a type of the first charging power supply used for the charging of the storage battery apparatus exceeding the predetermined threshold to prevent mixing of the first and second charging power supplies.

* * * * *